United States Patent
Bowser et al.

[11] Patent Number: 6,149,399
[45] Date of Patent: Nov. 21, 2000

[54] FUEL TANK DUAL FUEL DELIVERY MODULE

[75] Inventors: Brett Eric Bowser, Dearborn; Jay Edwin Drow, Ann Arbor; Kelley Brandt Munn, Ypsilanti, all of Mich.

[73] Assignee: Ford Global Technologies, Inc., Dearborn, Mich.

[21] Appl. No.: 09/217,299

[22] Filed: Dec. 21, 1998

[51] Int. Cl.[7] .................................................. F04B 49/00
[52] U.S. Cl. .......................... 417/279; 417/313; 123/515; 123/509
[58] Field of Search .................................. 123/509, 478, 123/514, 516, 506, 447, 515, 497; 417/279, 462, 313, 203; 137/574

[56] References Cited

U.S. PATENT DOCUMENTS

| Re. 34,956 | 5/1995 | Djordievic | 417/462 |
|---|---|---|---|
| 5,038,741 | 8/1991 | Tuckey | 123/509 |
| 5,110,265 | 5/1992 | Kato et al. | 417/279 |
| 5,203,305 | 4/1993 | Porter et al. | 123/478 |
| 5,218,942 | 6/1993 | Coha et al. | 123/514 |
| 5,263,459 | 11/1993 | Talaski | 123/516 |
| 5,341,842 | 8/1994 | Chih et al. | 137/574 |
| 5,361,742 | 11/1994 | Briggs et al. | 123/506 |
| 5,408,970 | 4/1995 | Burkhard et al. | 123/447 |
| 5,450,832 | 9/1995 | Graf | 123/515 |
| 5,511,957 | 4/1996 | Tuckey et al. | 417/313 |
| 5,642,719 | 7/1997 | Brown | 123/509 |
| 5,647,331 | 7/1997 | Swanson | 123/516 |
| 5,878,724 | 3/1999 | Channing | 123/514 |
| 5,881,698 | 3/1999 | Tuckey et al. | 123/497 |
| 5,960,775 | 10/1999 | Tuckey | 123/509 |
| 6,012,904 | 1/2000 | Tuckey | 417/203 |
| 6,029,633 | 2/2000 | Brandt | 123/509 |

*Primary Examiner*—Teresa Walberg
*Assistant Examiner*—Leonid Fastovsky

[57] ABSTRACT

A fuel delivery module (10) adaptable for use in a gasoline or diesel fuel tank includes certain common module components for use in both gasoline or diesel fuel delivery applications. The common module components include a support frame (12) having a first cover (14) for closing off an opening of the fuel tank and including a fuel supply port (20) and fuel return port (22) for communication to the engine fuel supply/return system and a second base cover for positioning on a bottom wall of the fuel tank and having a fuel pump-receiving chamber thereon. The base cover (30) includes a first diesel fuel pick-up opening (44) that can be communicated to the fuel supply port on the first cover by a suitable diesel fuel supply conduit when the fuel tank contains diesel fuel. The base cover also includes a second gasoline or diesel fuel opening (48) that is protected by a fuel pump filter (94) and is communicated to an inlet of a fuel pump (92) received in the fuel pump-receiving chamber (33) such that gasoline or diesel fuel is pumped to the fuel supply port on the first cover through a suitable fuel supply conduit. A diesel or gasoline fuel return conduit is connected to the return port on the first cover depending on the type of fuel contained in the fuel tank. The fuel supply conduits/connections and presence/absence of the fuel pump can be selected as required to adapt the fuel delivery module for use with a diesel or gasoline fuel tank.

10 Claims, 2 Drawing Sheets

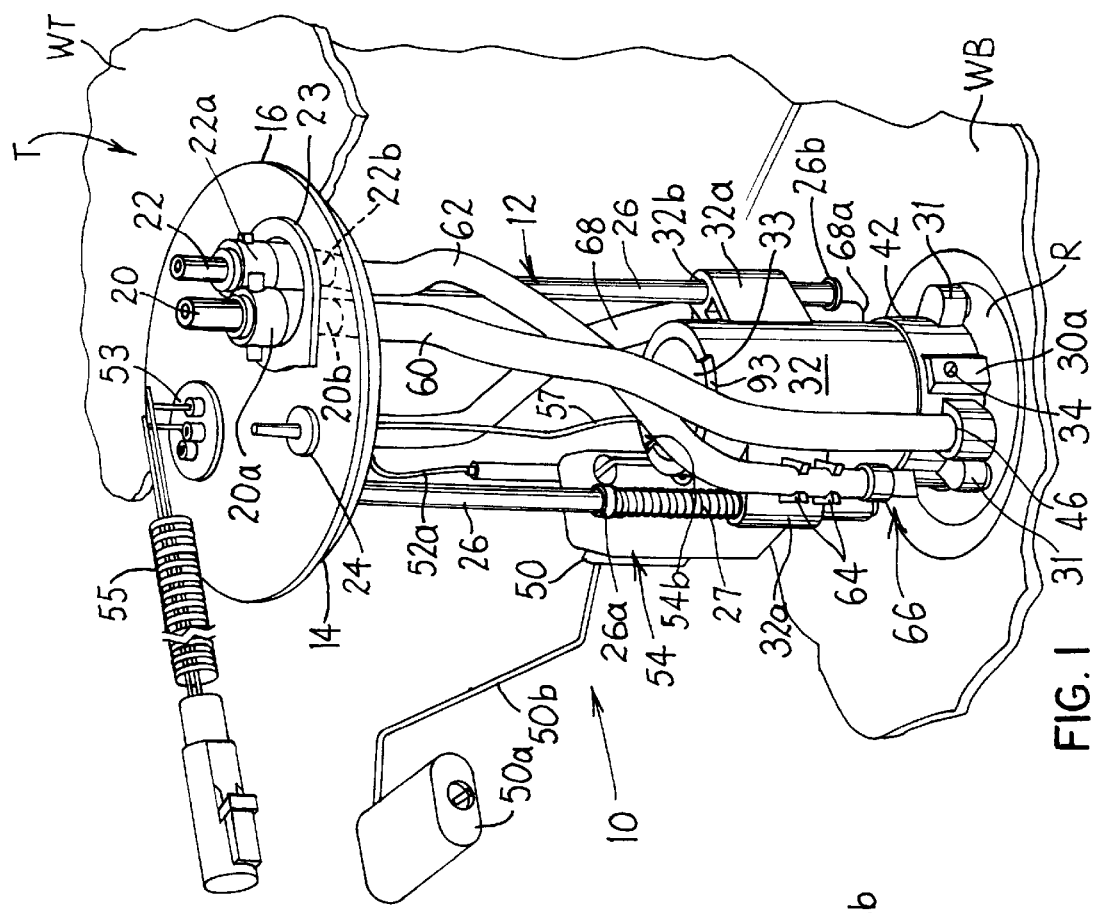

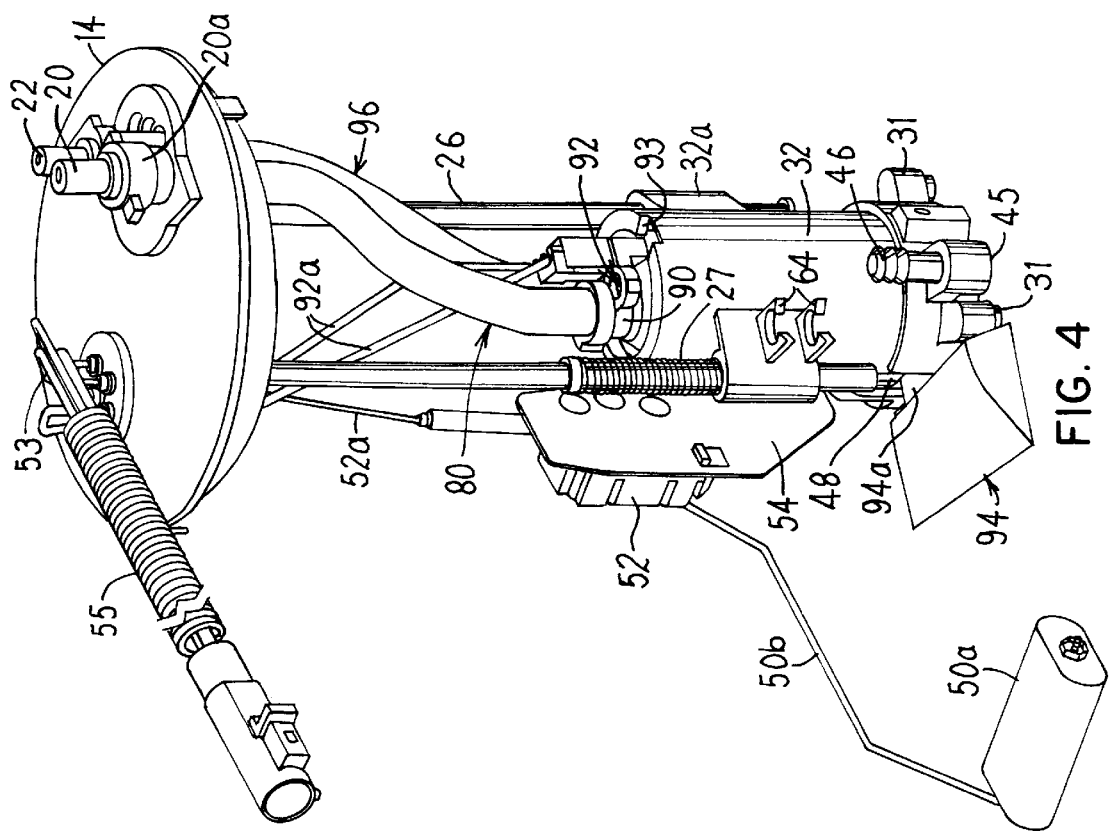
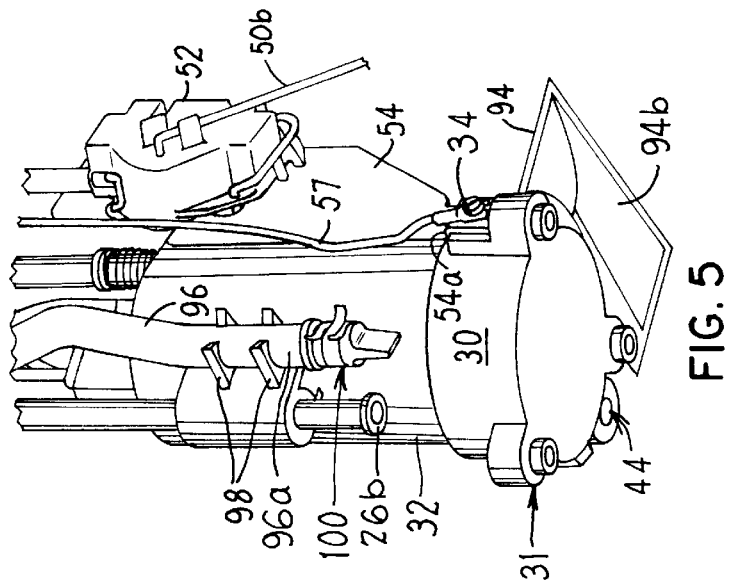

FUEL TANK DUAL FUEL DELIVERY MODULE

BACKGROUND OF THE INVENTION

1. Field of the Invention

The present invention relates to a fuel delivery module adaptable for use in a diesel or gasoline fuel tank to deliver fuel to an internal combustion engine.

2. Description of Related Art

Fuel delivery modules have been provided in gasoline (petrol) fuel tanks for pumping fuel from the fuel tank to the vehicle gasoline engine. Such gasoline fuel delivery modules have included a plastic or stainless steel bracket or frame on which a submersible electric fuel pump and fuel level float and sender device are mounted in the fuel tank. A fuel supply hose is connected to the fuel pump for supplying fuel to the engine, while a fuel return hose is provided on the delivery module to return unused fuel back to the fuel tank. A fuel siphon hose may be present to permit siphoning of fuel from the fuel tank for auxiliary fuel-fired components.

Fuel delivery modules also have been provided in diesel fuel tanks for drawing diesel fuel from the fuel tank to the vehicle diesel engine. Diesel fuel delivery modules have used engine vacuum to draw diesel fuel from the fuel tank through a fuel pick-up hose on the fuel delivery module. Unused diesel fuel is returned to the fuel tank through a separate fuel return hose on the module.

In the past, fuel delivery modules for gasoline fuel tanks and diesel fuel tanks have not been interchangeable. As a result, different module production tooling and different module inventories have been required. Moreover, complex production line change-overs are required in changing from manufacture of gasoline fuel delivery modules to diesel fuel delivery modules and vice versa.

An object of the present invention is to provide a fuel delivery module having certain common module components adapted for use in both gasoline or diesel fuel delivery applications and other module components that can be configured in a production-tolerant manner for use with the common module components as required for gasoline or diesel fuel delivery applications.

SUMMARY OF THE INVENTION

In accordance with an embodiment of the present invention, the common module components include a support frame having a first cover for closing off an opening in an upper wall of the fuel tank and a second base cover for positioning on a bottom wall of the fuel tank. The first cover includes a fuel supply port and fuel return port for communication to an engine fuel supply/return system. The base cover includes a first (e.g. diesel) fuel pick-up opening and a second (e.g. gasoline/petrol or diesel) fuel pick-up opening that is communicated to a fuel pump-receiving chamber thereon that may be protected by a fuel pump filter disposed on the base cover.

The fuel supply port can be communicated to the first or second fuel pick-up opening by a fuel supply conduit. The fuel return port is connectable to a fuel return conduit for returning gasoline or diesel fuel to the fuel tank. The fuel conduit connections and presence/absence of the fuel pump/ fuel pump filter are selected as necessary to adapt the fuel delivery module for use with a diesel or gasoline/petrol fuel tank.

The support frame of the fuel delivery module preferably includes a fuel level float and sender device mountable on the support frame at one of different alternative mounting positions located to accommodate different diesel or gasoline/petrol fuel tank designs.

The above objects, features and advantages of the present invention will become more readily apparent from the following detailed description taken with the following drawings.

BRIEF DESCRIPTION OF DRAWINGS

FIG. 1 is a perspective view of a fuel delivery module in accordance with an embodiment of the invention as adapted for use with a diesel fuel tank.

FIG. 2 is an enlarged perspective view showing the fuel level float and sender device of the module.

FIG. 3 is an enlarged view of the base cover of the module.

FIG. 4 is a perspective view of a fuel delivery module in accordance with another embodiment of the invention as adapted for use with a gasoline or diesel fuel tank.

FIG. 5 is an enlarged perspective view showing the fuel return conduit of the module.

DETAILED DESCRIPTION OF THE PREFERRED EMBODIMENT

The present invention provides a fuel delivery module 10 having certain common module components adaptable for use in a diesel or gasoline (petrol) fuel tank. Other module components are provided and reconfigured to adapt the fuel delivery module for gasoline or diesel fuel delivery applications. For example, FIGS. 1–3 illustrate a fuel delivery module adapted for use without a fuel pump in a diesel fuel tank T, while FIGS. 4–5 illustrate the fuel delivery module having reconfigured fuel supply hose and hose connections to an electric fuel pump/fuel pump filter for use in a gasoline fuel tank.

With respect to FIGS. 1–3, fuel delivery module 10 adapted for use with a diesel fuel tank T includes a support frame 12 having a first cover 14 for closing off an opening 16 in an upper wall WT of the fuel tank T, through which opening the module 10 is positioned in the fuel tank T. The first cover 14 comprises a suitable plastic plate that is sealed with the fuel tank wall WT in fuel tight manner in conventional manner using one or more conventional separate O-rings seals (not shown) located between the cover 14 and tank wall WT and a conventional locking ring (not shown) threaded onto a boss on the tank wall WT to lock the cover 14 on the wall WT with the O-ring seal(s) therebetween and forming no part of the invention. U.S. Pat. Nos. 4,651,701; 4,694,857; and 5,070,849 disclose fuel delivery modules with a cover plate sealed to a fuel tank using various techniques. The fuel tank T can comprise a conventional metal or plastic diesel (or gasoline) tank.

The first cover 14 includes a tubular fuel supply port 20 and tubular fuel return port 22 for communication to a conventional engine fuel supply/return system, such as, for example, a diesel fuel system. The fuel supply port 20, 22 can comprise so-called conventional John Guest connectors having respective spring loaded collars 20a, 22a that lock on respective tubes of a support body 23 mechanically snapped on the cover plate 14. For example, the fuel supply port 20 supplies fuel to the fuel injection system and the fuel return port 22 receives unused fuel from the fuel injection system for return to the fuel tank T in conventional manner. An optional auxiliary (e.g. fuel-fired heater) port 24 can be integrally molded with first cover 14 to supply fuel to a vehicle heater device or other fuel-fired accessory (not shown). The fuel supply port 20 and fuel return port 22 communicate to respective fuel supply and fuel return hose barbed tubular fittings 20b, 22b (similar in configuration to barbed fuel fitting 46 described below and shown in FIG. 4) that are molded or otherwise provided on the underside of support body 23. Optional auxiliary port 24 includes a similar hose barbed fitting on the underside of cover 14.

In lieu of the fuel supply and return port connectors illustrated, the fuel supply port 20, fuel return port 22, and auxiliary port 24 alternately can comprise molded plastic or metal port components welded or joined to the first cover 14 or fuel supply and return port components formed integral with the cover 14, although the invention is not limited to any particular fuel supply and return port construction.

The first cover 14 is connected by a pair of elongated cylindrical plastic or metal support frame legs or posts 26 to a second base cover 30. The support frame posts 26 typically are press fit in the cover 14 (e.g in integrally molded, downwardly extending tubular cover projections) and slidably mated to the base cover 30 via tubular base cover housing 32. For example, base cover housing 32 includes integral flanges 32a disposed on opposite sides and including respective flange passages 32b configured to slidably receive the support posts 26. One or both support post 26 includes a circumferentially enlarged shoulder 26b to prevent pull out of the posts 26 from the base cover 32. A coil spring 27 is provided about one or both of the support posts 26 between a circumferentially enlarged annular post bead 26a and a housing flange 32a to bias the base cover 32 in contact against the bottom wall of the fuel tank as it may expand/contract in use.

The base cover 30 and base cover housing 32 are joined together by two (or more) self-tapping screws or other fasteners 34 in a manner that base cover 30 closes off a fuel pump-receiving chamber 33 thereon defined in tubular housing 32. The fasteners 34 typically are provided at reinforced bosses 30a molded on the base cover 30.

The base cover 30 is adapted to be positioned on bottom wall WB of fuel tank T and, as mentioned, to close off the fuel pump-receiving chamber 33. The base cover 30 includes a plurality of depending feet 31 (e.g. three shown) that rest on bottom fuel tank wall WB shown as including a recessed fuel reservoir R for receiving the base cover 30. The base cover 30 typically is molded of plastic to include a bottom wall 40 and an upstanding side wall 42 together defining a lowermost region of fuel-pump-receiving chamber 33 and in which housing 32 is nested above the bottom base or wall 40 and affixed by fasteners 34 through side wall 42.

The base cover 30 includes a downwardly facing first (e.g. diesel) fuel pick-up opening 44 spaced a short distance above bottom fuel tank wall WB by feet 31 and communicated by a fuel passage molded in integrally molded boss 45 in fuel flow relation to hose barbed fitting 46 molded integrally at the periphery of the base cover. The base cover also includes a second side-facing fuel (e.g. gasoline or diesel) pick-up opening 48 in the side wall 42 so as to communicate to the fuel pump-receiving chamber 33 via fuel filter media or element described below.

A conventional float arm/fuel level float assembly 50 having a float 50a and float arm 50b and electric (e.g. rheostat) sender device 52 are mounted on housing 32 at one of two alternative mounting positions spaced 180 degrees apart on the housing 32 as determined by the positions of bosses 30a/fasteners 34. For example, the fuel level float assembly 50 and sender device 52 are mounted on a mounting plate 54 in turn having a bent depending mounting plate tab 54a fastened to one of bosses 30a by one of the fasteners 34, FIGS. 2 and 5, and by a mounting plate clip 54b received in one of two slots 93 on housing 32. The float arm 50b can be oriented to face in either a forward or aft direction as defined by fuel tank orientation. The wire leads 52a of the sender device 52 extend to a sealed fitting 53 in the cover 14 and through a protective conduit 55 to a conventional electrical harness (not shown) of the vehicle. A ground wire 57 extends through fitting 53 and is connected to the fastener 34 by which mounting plate 54 is fastened to base cover 30.

In use in a diesel fuel tank, FIGS. 1–3, the hose barbed fitting 20b beneath fuel supply port 20 is connected by a diesel fuel supply conduit or hose 60 to the hose barbed fitting 46 of the base cover 30 to draw diesel fuel from the fuel tank through the diesel fuel pick-up opening 44 using engine vacuum for supply to the engine fuel injection system. The hose barbed fitting 22b beneath fuel return port 22 is connected to a diesel fuel return conduit or hose 62 having an end 62a held in position proximate to diesel fuel pick-up opening 44 by a pair of hose clips 64 molded on the housing 32 to discharge warm unused diesel fuel to the fuel tank to warm diesel fuel in the vicinity of the pick-opening 44. The end 62a of the return hose 62 includes a check valve 66 therein to prevent reverse flow of diesel fuel therein. The hose barbed fitting beneath auxiliary port 24 is connected to a diesel fuel supply conduit or hose 68 having an open end 68a held in a position to pick-up fuel by a pair of hose clips 70 molded on the housing 32.

In use in a gasoline (also known as petrol) fuel tank, FIGS. 4–5 where like features of FIG. 1–3 are represented by like reference numerals, the fuel supply port 20 is connected by a gasoline fuel supply conduit or hose 80 to the fuel outlet 90 of a conventional electrical fuel pump 92 positioned in the chamber 33 to draw gasoline fuel through fuel pump filter media or element 94 and the gasoline pick-up opening 48 into the lowermost region of chamber 33 where the fuel is drawn into a fuel inlet (not shown) of the pump 92 through the filter ferrule 94a residing in fuel pick-up opening 48. The gasoline fuel in turn is discharged from the upper pump outlet 90 into gasoline fuel supply hose 80 for supply to the engine fuel system. The fuel pump 92 is indexed in position in housing 32 so that pump filter ferrule 94a is received in gasoline pick-up opening 48.

The pump filter ferrule 94a is snapped on or otherwise fastened on base 30 in gasoline pick-up opening 48. The filter element 94 includes a flat bottom region 94b adapted to rest on the bottom of a conventional gasoline fuel tank, which may be metal or plastic. The wire leads 92a of the fuel pump 92 extend to sealed fitting 53 in the cover 14 and through protective conduit 55 to a conventional electrical harness (not shown) of the vehicle. The fuel return port 22 is connected to a gasoline fuel return conduit or hose 96 having an end 96a held in position in the fuel tank by a pair of hose clips 98 molded on the housing 32 to discharge unused gasoline back to the fuel tank. The end 96a of the return hose 96 includes a check valve 100 therein to prevent reverse flow of gasoline fuel therein.

It is apparent that the diesel fuel pick-up opening 44 and barb fitting 46 are not used and serve no function when the fuel delivery module 10 is adapted for use in a gasoline fuel tank embodiment, FIGS. 4–5. Moreover, it is apparent that the gasoline fuel supply hose 80 is substituted for the diesel fuel supply hose 60 and connected to outlet 90 of fuel pump 92 protected by filter 94. The gasoline fuel return hose 96 shown can be substituted for diesel supply hose 62 and rerouted on the housing 32 via hose clips 98. The auxiliary port 24 is not used and thus not molded on or otherwise incorporated on cover 14 in FIGS. 4–5.

Although the embodiment of FIGS. 4–5 is described above for use with a gasoline fuel tank, this embodiment can be used in a diesel fuel tank by using a conventional electric diesel fuel pump in chamber 33 rather than in lieu of gasoline fuel pump 92 with or without a fuel filter element. The fuel delivery module 10 of the invention thus can be adapted for use in diesel fuel tanks with or without an electric diesel fuel pump.

What is claimed is:

1. Fuel delivery module adaptable for use in a gasoline or diesel fuel tank, comprising a support frame having a first cover for closing off an opening in an upper wall of the fuel tank, said first cover having a fuel supply port and fuel return port, and a second base cover for positioning on a bottom wall of said fuel tank and having a fuel pump-receiving chamber thereon, said base cover including a first fuel pick-up opening and a second fuel pick-up opening communicated to said fuel pick-up pump-receiving chamber, said fuel supply port being alternately communicated to said first fuel opening by a first fuel supply conduit or to a fuel pump received in said chamber by a second fuel supply conduit, said fuel return port being connectable to a fuel return conduit for returning fuel to said fuel tank.

2. The module of claim 1 further including a fuel pump filter cooperating with said base cover to filter fuel drawn into said chamber by said pump.

3. The module of claim 1 further including a fuel level float and sender device located on said support frame at one of alternative mounting positions.

4. The module of claim 1 wherein said base cover includes a plurality of feet on a bottom thereof for resting on said bottom wall of said fuel tank.

5. The module of claim 4 wherein said first fuel pick-up opening faces downwardly toward said bottom wall of said fuel tank and is spaced above said bottom wall by said feet.

6. The module of claim 1 wherein first fuel pick-up opening comprises a diesel fuel pick-up hose barbed fitting formed integrally on said base cover and said second fuel pick-up opening comprises a gasoline or diesel fuel pick-up opening communicating to said pump-receiving chamber.

7. The module of claim 1 further including a fuel-fired accessory port on said first cover for connection to a second fuel supply conduit.

8. A method of assembling a fuel delivery module for a fuel tank, comprising:

a) providing a fuel delivery module having a support frame with a first cover for closing off an opening of the fuel tank, said first cover having a fuel supply port and fuel return port, and a second base cover for positioning in an upper wall of said fuel tank and having a fuel pump-receiving chamber thereon, said base cover including a first fuel pick-up opening and a second fuel pick-up opening communicated to said fuel pump-receiving chamber, b) communicating said fuel pick-up supply port to said first fuel opening using a first fuel supply conduit or to a fuel pump positioned in said chamber using a second fuel supply conduit, and c) communicating said return port to said fuel tank by a fuel return conduit.

9. The method of claim 8 wherein first fuel pick-up opening comprises a diesel fuel pick-up hose barbed fitting formed integrally on said base cover and connected to said fuel supply port by a diesel fuel supply hose.

10. The method of claim 8 wherein second fuel pick-up opening communicates to a gasoline or diesel pump inlet and a pump outlet is connected to said fuel supply port by a gasoline or diesel fuel supply hose.

* * * * *

UNITED STATES PATENT AND TRADEMARK OFFICE
CERTIFICATE OF CORRECTION

PATENT NO    : 6 149 399
DATED        : November 21, 2000
INVENTOR(S)  : Brett Eric BOWSER, et al.

It is certified that error appears in the above-identified patent and that said Letters Patent are hereby corrected as shown below:

Column 5, line 21; delete "pick-up".

Column 5, line 23; after "fuel" (first occurrence) insert ---pick-up---.

Signed and Sealed this

Fifteenth Day of May, 2001

*Attest:*

NICHOLAS P. GODICI

*Attesting Officer*    *Acting Director of the United States Patent and Trademark Office*